Patented Dec. 29, 1931

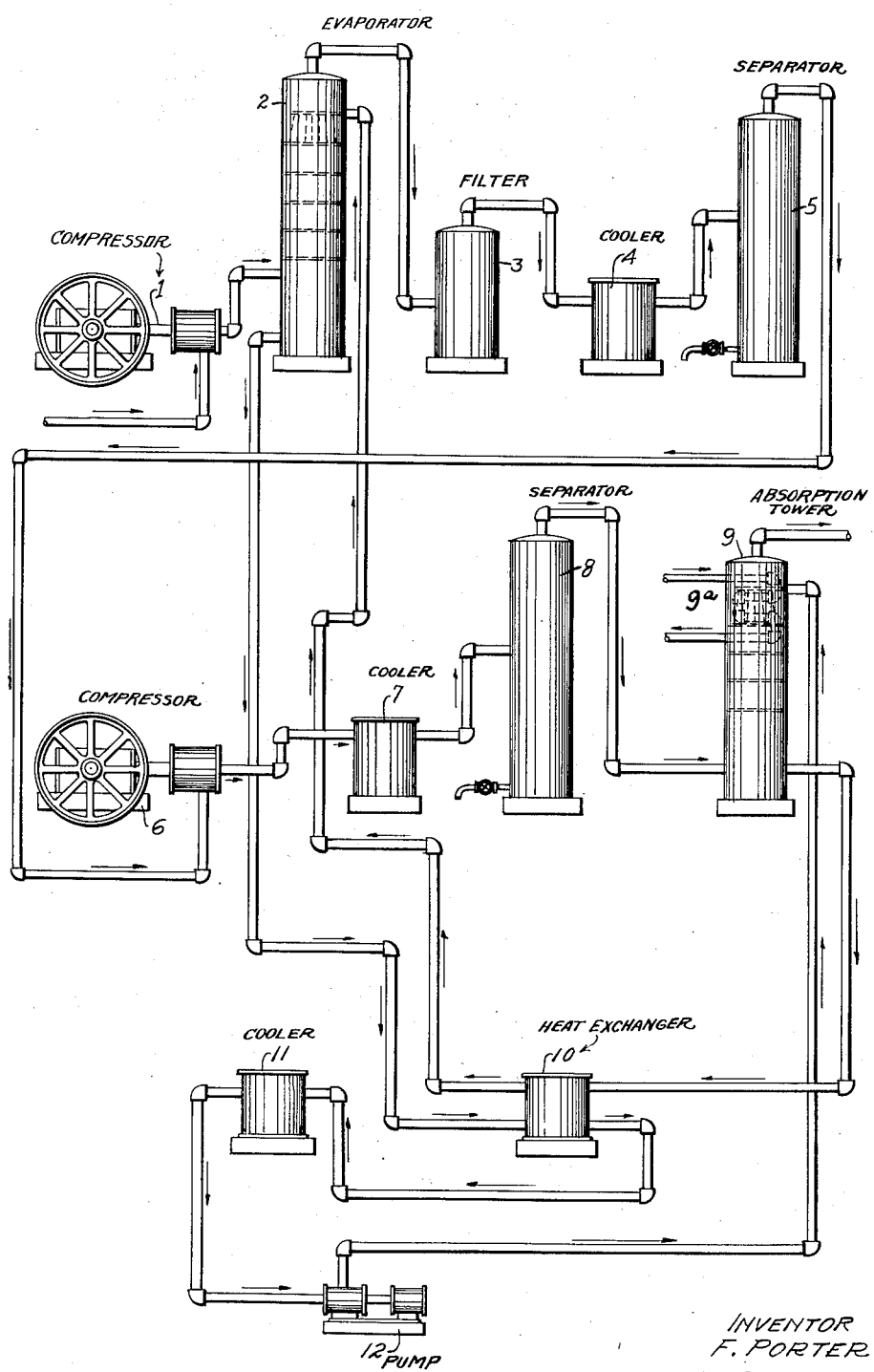

1,838,449

UNITED STATES PATENT OFFICE

FRANK PORTER, OF PONCA CITY, OKLAHOMA, ASSIGNOR, BY MESNE ASSIGNMENTS, TO CONTINENTAL OIL COMPANY, OF PONCA CITY, OKLAHOMA, A CORPORATION OF DELAWARE

PROCESS OF AND APPARATUS FOR THE EXTRACTION OF GASOLINE FROM NATURAL GAS

Application filed July 28, 1927. Serial No. 208,966.

This invention relates to improved means and methods for use in the extraction of liquids from gaseous products, and is herein illustrated and described with particular reference to the manufacture from natural gas of liquid hydrocarbons, commonly known as natural gasoline. An object of the invention consists in the provision of an improved method by the practice of which a large yield of gasoline may be obtained from the gas treated. Another object of the invention consists in the provision of a simple apparatus capable of operating, with a small expenditure of fuel, to carry out the improved method of extracting the gasoline from natural gas.

In the accompanying drawing which forms a part of the specification, I have illustrated diagrammatically, an apparatus suitable for carrying out my process.

In the illustrative embodiment of my invention, the gas to be treated enters a low stage compressor cylinder (1), passes upward through an evaporator (2), and through a filter bed (3), and is cooled by water in a cooler (4). Any liquid condensing is separated in a trap (5). The gas then passes to a second, or high stage compressor (6), and is thereafter cooled in a cooler (7). A further amount of gasoline is condensed and collects in a trap (8). The gas passing out of the trap (8) contains an appreciable amount of uncondensed gasoline. The gas is then passed up through an absorber (9), in counter-current contact with a suitable liquid absorbent such, for example, as oil. The enriched oil from the bottom of the absorber flows through a heat exchanger (10), and thence to the top of the evaporator (2), which serves to evaporate the gasoline from the oil. The oil passes down through the evaporator counter-current to and in contact with the hot gas from the low stage compressor. The oil gives up its dissolved gasoline to the gas entering the evaporator from the low stage compressor. The denuded oil passes out the bottom of evaporator (2), through heat exchanger (10) and cooler (11), thence to the circulating pump (12) and into the top of the absorber (9).

The enrichment of the gas in the evaporator (2), with gasoline vapor from the oil causes a correspondingly larger amount of gasoline to be condensed in the coolers (4) and (7).

The denuded oil on entering the absorber (9), absorbs, in addition to gasoline vapor, a certain amount of more volatile gases. The heat of absorption of these vapors causes the temperature of the oil to rise. A cooling coil $9^2$ may be conveniently placed in the oil at the top of the absorber to lower the temperature and increase the efficiency of the oil as an absorbing medium. The use of this cooling coil is, however, not entirely necessary unless, perhaps the gas is rich in constituents such as propane and butane.

A typical example of the operation follows:

The gas to be treated enters the low stage compressor cylinder 1, is compressed to forty pounds and passes upward to the evaporator 2, leaving at approximately 210° F. From the evaporator 2 the gas passes through a filter bed 3 in order to remove any entrained oil droplets which would produce an off-color liquid product. After passing the filter the material is directed to a separator or trap 5 subsequent to passing the cooler 4. The gas is then passed to a compressor 6 from which it discharges at approximately 250 pounds pressure into a cooler 7, thence to a separator or trap 8. The gas passing out of the separator 8 contains an appreciable amount of uncondensed gasoline which is directed through an absorber 9 in countercurrent contact with a liquid absorbent oil. The stripped gas passes out of the absorber 9 through a top draw-off line. The enriched oil is drawn off from the bottom of the absorber and flows through a heat-exchanger 10, passing thence to the evaporator 2 at approximately 350° F. The heat in the evaporator evaporates the gasoline from the oil. The oil passes down countercurrent to and in contact with the hot gases from the low stage compressor 1, the oil giving up its dissolved gasoline to the gas. The denuded oil passes out through the bottom of the evaporator through heat-exchanger 10 and cooler 11 which cools the absorber oil to approximately 70° F., the circulating pump 12 delivering the absorber oil into the top of the absorber 9. The enrichment of the gas in the evaporator 2 with gasoline vapor from the oil causes a correspondingly large amount of gasoline to be condensed in traps 5 and 8 from which it is removed to storage.

This process may be successfully used in stripping any kind of natural gas. Commercial application has been carried on in which gas showing 0.5 gallon of gasoline per one thousand cubic feet by charcoal test has been stripped to 0.1 gallon per thousand cubic feet by charcoal test.

While natural gasoline and natural gas are mentioned in this specification, it is to be understood that other volatile liquids may be extracted from a gaseous mixture in a similar manner, as, for example, benzol may be extracted from a gaseous mixture, water vapor may be removed from a gas by the circulation of a brine or other liquid in which water is soluble, etc. It is to be understood, therefore, that the invention in its application is not to be restricted to the extraction of natural gasoline from natural gas, but contemplates performing beneficially the extraction of analogous ingredients from similar products.

Having thus described my invention what I claim as new and desire to secure by Letters Patent of the United States is:

1. A process for the extraction of gasoline from natural gas comprising the steps of compressing the gas in an initial stage, contacting the heated compressed gas with an absorbent hydrocarbon containing gasoline and removing the gasoline from the absorbent oil by evaporation, passing the stripped gas to a stage of increased pressure and subsequently to cooling and separating stages for additional extraction of liquid condensate therefrom, removing the absorbent oil from the initial compression stage and contacting the final resultant gas with said liquid absorbent.

2. An apparatus for the extraction of gasoline from natural gas which consists of a low stage compressor, an evaporator in which the hot gas from the low stage compressor is contacted with an absorbent liquid, the purpose of said evaporator being to remove gasoline from the absorbent liquid, a filter for removing liquid particles from the gas, a gas cooler, a trap for separating liquid condensate, a high stage compressor connected with the trap, a cooler for the gas that has passed through the high stage compressor, a trap for separating liquid condensing under the higher pressure, an absorber for contacting the high pressure gas with a liquid absorbent, means for circulating the liquid absorbent between said evaporator and absorber, means for interchanging the heat between the absorbent going to and coming from the evaporator, and means for cooling the oil going to the absorber at the point of contact of the oil with the gas at the top of the absorber.

3. A process for the extraction of gasoline from natural gas comprising the steps of compressing the gas in an initial evaporating stage, contacting the heated compressed gas with an absorbent hydrocarbon containing gasoline in said evaporating stage, cooling and separating products evaporated off with the gas from the absorbent oil, passing the gas after removal of the gasoline fractions to a stage of increased pressure and subsequently to cooling and separating stages wherein additional liquid condensate is extracted, recycling the absorbent oil from the initial compression stage and contacting it with the gas discharged from the secondary extraction stages.

4. A process for extracting a volatile liquid from gas comprising the steps of circulating an absorbent continuously in a cyclic flow, subjecting the gas to separate stages of compression, each compression stage accompanied by subsequent stages of cooling and separation including the cyclic flow of the absorbent oil into the system to absorb volatile liquid fractions from the gas in the high pressure stages of the system, and returning the absorbent oil laden with said volatile fractions to the initial stages of compression and reduced pressure for evaporation.

5. In the recovery of gasoline from natural gas, a process having a plurality of successive compression and cooling stages which comprises the steps of initially compressing a gas, cooling the gas and separating the condensate therefrom, passing the uncondensed portion to a stage of increased pressure and continuously circulating an absorbent menstruum between the high and low pressure stages, and utilizing the menstruum as an absorbent liquid in the high pressure stage and as a vehicle to carry the liquid hydrocarbons removed from the gas, to the low pressure stage, removing the volatile fractions from the absorbent oil through pressure reduction and heating in the lower pressure stage.

In testimony that I claim the foregoing I hereunto affix my signature.

FRANK PORTER.